US010642599B1

(12) United States Patent
Killmon et al.

(10) Patent No.: US 10,642,599 B1
(45) Date of Patent: *May 5, 2020

(54) PREEMPTIVE DEPLOYMENT IN SOFTWARE DEPLOYMENT PIPELINES

(71) Applicant: Amazon Technologies, Inc., Seattle, WA (US)

(72) Inventors: David Killmon, Seattle, WA (US); Felix Jodoin, Seattle, WA (US); Nathaniel Gaertner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/201,528

(22) Filed: Nov. 27, 2018

Related U.S. Application Data

(63) Continuation of application No. 15/083,137, filed on Mar. 28, 2016, now Pat. No. 10,146,524.

(51) Int. Cl.
*G06F 9/44* (2018.01)
*G06F 8/65* (2018.01)

(52) U.S. Cl.
CPC ..................... *G06F 8/65* (2013.01)

(58) Field of Classification Search
CPC ....................................................... G06F 8/65
See application file for complete search history.

(56) References Cited

U.S. PATENT DOCUMENTS

| | | | | |
|---|---|---|---|---|
| 9,021,458 B1* | 4/2015 | Jacob | ............... | G06F 8/65 717/168 |
| 9,110,770 B1* | 8/2015 | Raju | ............... | G06F 8/77 |
| 9,311,066 B1* | 4/2016 | Garman | ............... | G06F 8/60 |
| 2004/0107125 A1* | 6/2004 | Guheen | ............... | G06Q 50/01 705/319 |
| 2006/0080656 A1* | 4/2006 | Cain | ............... | G06F 8/65 717/174 |
| 2014/0149283 A1* | 5/2014 | Roselli | ............... | G06Q 20/10 705/39 |
| 2014/0189641 A1* | 7/2014 | Anderson | ............... | G06F 8/60 717/110 |
| 2016/0239280 A1* | 8/2016 | Scheiner | ............... | G06F 8/60 |
| 2016/0239281 A1* | 8/2016 | Avisror | ............... | G06F 8/61 |
| 2018/0322437 A1* | 11/2018 | McClory | ............... | G06F 11/3688 |

OTHER PUBLICATIONS

Title: Securing a deployment pipeline author: L Bass et al, published on 2015.*
Title: A characterization framework for software deployment technologies, author: A Carzaniga, et al, published on 1998.*

* cited by examiner

*Primary Examiner* — Chameli Das
(74) *Attorney, Agent, or Firm* — Patterson + Sheridan, LLP

(57) ABSTRACT

Techniques are disclosed for reducing the time needed to deploy updated versions of an application using a deployment pipeline. To do so, a deployment manager may collect statistics reflecting how often any given stage of the deployment pipeline is completed successfully in deploying updates to the application. In cases where a current stage has a sufficient approval percentage, the deployment pipeline may begin deploying an updated version of the application into an environment specified for a subsequent stage of the deployment pipeline, before the current stage of the pipeline is complete. Provided the current stage completes successfully, the subsequent stage can be initiated by activating the pre-deployed versions of the application.

21 Claims, 7 Drawing Sheets

PREEMPTIVE DEPLOYMENT IN SOFTWARE DEPLOYMENT PIPELINES

CROSS-REFERENCE TO RELATED APPLICATIONS

This application is a continuation of co-pending U.S. patent application Ser. No. 15/083,137, filed on Mar. 28, 2016. The aforementioned related patent application is herein incorporated by reference in its entirety.

BACKGROUND

Cloud computing allows an enterprise to access large amounts of computing resources. One technology underlying cloud computing is virtualization. Virtualization technology allows a physical computing server to host multiple virtual machine instances, each of which executes as an independent computing system with virtual hardware components, such as a CPU and memory, managed by an operating system. Once launched, an enterprise can run applications on a virtual machine instance in the same manner as applications running on a physical computing system or server used by the enterprise. Because additional virtual machine instances can be launched on demand, cloud computing allows an enterprise to obtain computing resources as needed without having to invest and maintain an underlying physical computing infrastructure.

In addition to compute services (e.g., virtual machine instances), cloud computing providers frequently offer a variety of other computing resources and services to enterprise customers. For example, a service provider may offer database services, persistent storage services, networking services, load balancing, auto-scaling, messaging services, cloud formation services, monitoring services etc., as part of a cloud based services offering. Enterprises can use these cloud-based services to deploy software applications and services which are hosted on the service-provider cloud. Of course, an enterprise can also host applications and services on physical computing systems controlled by the enterprise.

In order to push an application update into production, enterprises sometimes use a deployment pipeline. Generally, a deployment pipeline automates the processes of building, testing, and deploying an updated version of application each time a new version of the application is available (e.g., when a production branch of the application source code is committed to a version control system). Of course, deployment pipelines can also perform an initial deployment of an application into production use. Deployment pipelines allow an enterprise to manage the deployment process, while rapidly and reliably delivering new features and updates.

In practice, deployment pipelines typically specify a sequence of testing stages used to push an updated application into production service (e.g., stages for unit tests, integration tests, followed by stages for beta testing, one-box production testing, and lastly, full production deployment stages). Provided the testing at each stage is successful, the updated application is pushed into increasingly broader production environments until the deployment is complete. If a new version of an application being pushed into production fails an approval requirement or otherwise proves to be disruptive, the application is restored to a prior state. Depending on the testing requirements specified for a given stage, the deployment process can take minutes, hours, or even days to complete.

BRIEF DESCRIPTION OF DRAWINGS

Various embodiments in accordance with the present disclosure will be described with reference to the drawings, in which.

DETAILED DESCRIPTION

Figure 1:
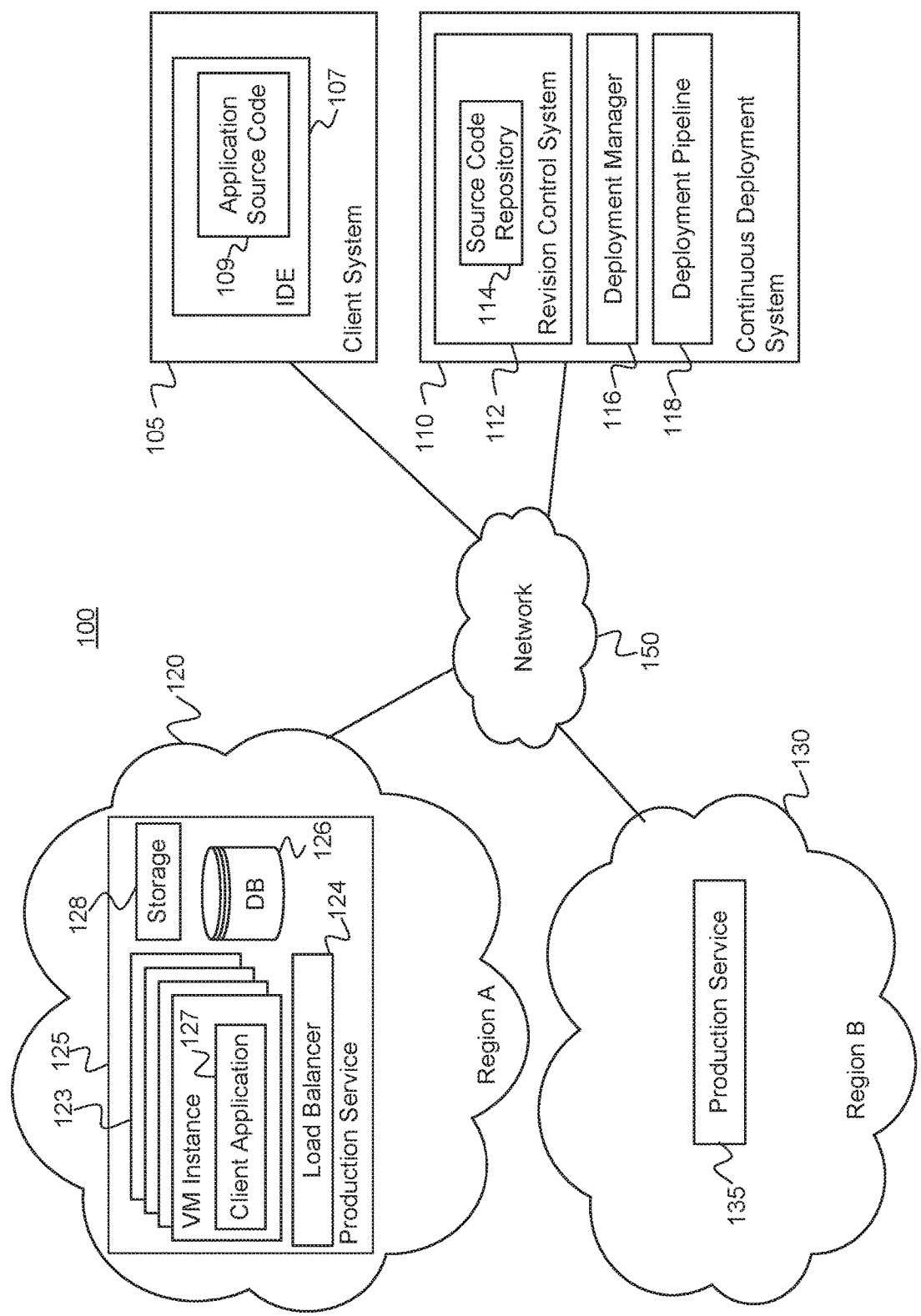
FIG. 1 illustrates an example of a cloud computing environment hosting an application updated using a deployment pipeline which supports preemptive deployment for certain pipeline stages, according to one embodiment.

Embodiments presented herein provide techniques for deploying and updating applications using a continuous delivery (CD) deployment pipeline, or just "deployment pipeline." Generally, a deployment pipeline refers to an automated process for pushing an application into production use. Following an initial production deployment, a deployment pipeline may also be used to push changes or updates made to an application into production use. For example, as developers add new features, improve existing features, or fix errors in a software application or service, the deployment pipeline can build the application and initiate a sequence of testing stages to evaluate and deploy a new revision of the application. The stages may include unit test stages, integration test stages, beta testing or other pre-production stages where the application is tested without using live production data. Provided the pre-production test stages are successful, the deployment pipeline may begin pushing the application into increasingly broader production environments during production test stages.

Changes made to the source code or configuration artifacts of an application may trigger a deployment cycle where a new version may be tested and put into production use. For example, as changes to the source code of the application are committed to a production build tree, the deployment pipeline may automatically build a new version of the application and begin propagating the new version through the stages of the pipeline. Each stage of the deployment pipeline may include an approval workflow used to test and evaluate the new version of the application. Generally, the approval workflow for a current stage of the workflow needs to be completed successfully before an approval workflow for a subsequent stage of the deployment pipeline is initiated. If the approval workflow at a given stage fails (or times out) the deployment is aborted and any instances of the updated application deployed into production can be rolled back to the last stable version.

As noted, some approval workflows can minutes, hours, or even days to complete. For example, in pre-production testing, a test stage may simulate large numbers of transactions before completing an approval workflow. Similarly, an approval workflow for an initial production stage may specify that an updated application should run for a significant period of time without error on a single server (or specified number of servers) before advancing to the next pipeline stage and broader production deployment. In other cases, the approval workflow for an initial production stage could specify to run until a certain number of transactions are performed, until a certain number of features had been used, or a certain sustained production load has been tested. Thus, depending on the number of stages in a deployment pipeline, the additive time required to completely deploy an application can become quite long and itself become a disruption to the deployment process. As changes to a build branch may be quite frequent, it is useful to limit the time required to deploy a new revision of an application without sacrificing the effectiveness of the testing performed by the deployment pipeline.

The deployment pipeline may collect statistics reflecting how often the approval workflow defined by each stage passes or fails when deploying updates to the application. If a given stage passes the approval workflow associated with that stage a sufficient percentage of the time, the deployment pipeline may assume that future updates or revisions will also pass the given stage and that the application will eventually be deployed into the environment of the subsequent deployment stage.

In one embodiment, when a current stage of the pipeline is expected to pass the approval workflow for that stage, the deployment pipeline may begin pre-deploying the updated application into an environment specified by the next stage while the current stage is active. That is, prior to successfully completing a current stage of the pipeline, a preemptive deployment may be initiated to deploy the updated application into the environment and hosts associated with a next deployment stage.

Whether a preemptive deployment occurs may depend on the approval statistics collected for a given stage. For example, the preemptive deployment could be performed for a subsequent stage when the approval percentage associated with the current stage exceeds a minimum threshold. Alternatively, the determination could be based on a function that evaluates the approval statistics of the current stage (e.g., by weighing more recent deployment results for the current stage more heavily than older deployment results). Of course, other criteria or conditions could be used.

A deployment initiated for a subsequent stage initiated while a current stage is active is generally referred to as a "preemptive" deployment, as the code and dependencies are copied onto the hosts associated with the next deployment stage, without actually activating the updated application on such hosts. In addition to copying the updated application onto hosts, the preemptive deployment could perform a variety of other actions to prepare a computing environment for the subsequent deployment stage. For example, for pre-production stages, the hosts associated with the next deployment stage might need to be launched and provisioned before the updated application can be installed and readied for use. As another example, for production stages, systems which monitor performance metrics or other activity of the hosts could be provisioned and readied for use during the preemptive deployment.

Because the preemptive deployment occurs while the current stage is still ongoing, when the approval workflow for that stage is complete, the next stage can start by just activating the version of the application already deployed by the preemptive deployment. Thus, the next stage of the pipeline begins without having to first to copy, install, and configure the updated application code on the hosts of the next stage and without having to provision or configure any transient applications, systems, or services used by the next stage. Doing so may reduce the time needed to deploy an updated application using a deployment pipeline as well as encourage developers to compose stable approval workflows that can satisfy the conditions for performing the preemptive deployment.

Note, some embodiments are described herein relative to an example of an enterprise deploying an application or production service using services hosted by a cloud computing provider, e.g., compute, database, storage, and networking services, etc. available from a cloud computing provider. However, one of skill in the art will readily recognize that embodiments presented herein may be adapted for deployment pipelines managing applications or services hosted directly by an enterprise computing infrastructure.

FIG. 1 illustrates an example of a cloud computing environment 100 hosting an application updated using a deployment pipeline which supports a preemptive deployment for certain pipeline stages, according to one embodiment. As shown, the computing environment 100 includes a client computing system 105, a continuous deployment (CD) system 110, and two cloud computing regions—region A 120 and region B 130, connected to a public computing network 150 (e.g., the internet).

Cloud computing regions 120, 130 generally correspond to a region defined by a service provider in offering web services to client systems (e.g., the services used to build production service 125, 135). Developers may provision, launch, and manage virtualized computing resources within each cloud computing region 120, 130. While cloud computing regions may be drawn along arbitrary boundaries, cloud computing regions often correspond to geographic, national, or fault tolerance boundaries, where computing resources in one region are deployed and managed in a manner that is generally isolated from other regions. For example, cloud computing regions 120, 130 may each correspond to a data center (or data centers) located in a particular geographic area. Data centers in different regions may help provide fault-tolerant web services, e.g., should a data center in one region become inaccessible, other data centers in that region (or other regions) may continue to operate with little or no interruption to the web services hosted in such regions. Further, the provider may enable multiple physical or logical zones within a given cloud computing region. For example, a single data center used to provide a cloud computing region may offer multiple, fault tolerant availability zones, where a service disruption in one availability zone does not impact other availability zones within the same cloud computing region (or other regions) and the availability zones within a region may provide inexpensive, low-latency network connectivity to other availability zones within the same region.

In the example of FIG. 1, assume an enterprise customer has deployed a production service 125 in region 120. As shown, production service 125 includes a set of virtual machine (VM) instances 123, a database 126, and persistent storage 128. In addition, the production service 125 includes a load balancer 124 used to distribute requests received by the production service 125 to an instance of client application 127 on one of the VM instances 123. For discussion, assume the production service 125 provides an ecommerce website. In such a case, the client application 127 on VM instances 123 could each provide web and application servers configured to access database 126 and storage 128 as needed in order to process HTTP requests received from client browsers. As requests are received, a load balancer 124 distributes the HTTP requests to one of the VM instances 123. In turn, application 127 may read and write data related to customer requests or purchases to the database 126 and storage 128. Further, production service 125 could also incorporate a variety of other computing services offered by the cloud provider. For example, the count of VM instances 123 used by production service 125 could be increased or decreased based on demand using an autoscaling service. Similarly, a cloud monitoring service could monitor the health of VM instances 123 as well as gather performance metrics related the production service 125. Although not shown in the same degree of detail, the production service 135 in region 130 could have a deployed configuration that matches the configuration of production service 125 in region 120.

In one embodiment, revisions or updates to the client application 127 are deployed to the VM instances 123 of production service 125, 135 using a deployment pipeline. As shown, e.g., the continuous deployment system 110 includes a revision control system 112, a deployment manager 116, and a deployment pipeline 118. The continuous deployment system 110 is included to be representative of a physical computing system (e.g., a system in a data center) as well as virtual computing instances executing within a computing cloud (e.g., region 120, 130).

The deployment manager 116 provides software components configured to continuously integrate changes made to the software, related scripts, artifacts, or configuration states, etc., into the production service 125, 135 based on a sequence of test stages specified by the deployment pipeline 118. As described in greater detail herein, in one embodiment, the deployment manager 116 may begin a preemptive deployment for a next stage of the deployment pipeline 118 before a current stage of the pipeline is complete.

Generally, the revision control system 112 tracks changes made to the source code files of an application (e.g., client application 127) stored in source code repository 114 along with related information, such as the developer that made the made a given change, when the change was made, references to problems fixed or enhancements introduced by the change, copies of each prior version of a file or object, etc. The source code repository 114 can store different "branches" of source code of an application, allowing modifications or development to occur in parallel along multiple, independent paths. For example, new features may be made using a development branch prior to being merged into a build or production branch. Frequently, changes made to application source code are submitted for review prior to being incorporated or "committed" to a given branch of an application stored in the source code repository 114.

Client system 105 is included to be representative of a general purpose computing system such as desktop and laptop computer systems, as well as representative of mobile computing devices such as tablets and smart phones configured with service console applications, web browser software, or development tools. In this particular example, client system 105 includes an integrated development environment (IDE) 107 and application source code 109. The IDE 107 generally provides a programming environment used to develop software applications, such as client application 127. Accordingly, the IDE 107 may include components such as a code editor, compiler, and debugger, etc.

Assume a developer, using the IDE 107, checks out a portion of application source code 109 of client application 127 from the repository 114 of revision control system 112 (e.g., a file, method, object, function, module, etc.). Once checked out to the IDE 107, the developer may edit the source code 109, e.g., to add new features or fix issues. Once editing is complete, the developer checks the application source code 109 back into the source code repository 114. In one embodiment, once changes to the source code stored in a production build tree are committed in the revision control system 112, the deployment manager 116 may begin deploying the updated version to the production service 125, 135.

For example, after changes are committed to the revision control system 112, the deployment pipeline 118 could build client application 127. Once built, the deployment pipeline 118 may begin deploying the resulting new revision of client application 127 into production use, based on a sequence of testing and deployment stages defined by the deployment pipeline 118. For example, the deployment pipeline 118 may include pre-production testing stages, such as alpha, integration, and beta testing stages, where the application is tested using automated tests. Provided the pre-production stages are successful, gamma testing or integration testing may be performed. Typically, gamma testing includes testing the application deployed in a production-like environment, but without any "live" production traffic. Following gamma testing, customer-traffic-taking stages may include a one-box stage to test a single production instance of an application (e.g., by updating the client application 127 on one of the VM instances 123). After a period of time specified for one-box testing, the deployment pipeline 118 may begin to fully deploy the application to production service 125. A similar process may be used to deploy new versions of the client application 126 into production use by service 135.

In one embodiment, each stage of the deployment pipeline 118 may have an approval workflow specifying tests to pass, performance metrics to meet, or other criteria that needs to be satisfied or steps to perform in order to satisfy the approval workflow of a given stage. In addition, the deployment manager 116 may maintain approval statistics regarding how often an update to the client application 127 successfully completes any given stage of the deployment pipeline 118. Further, in one embodiment, while a current stage is active, if the next stage of the pipeline 118 has an approval percentage that exceeds a given threshold, then the deployment manager 118 may initiate a preemptive deployment to prepare a deployment environment and hosts associated with the next stage of the pipeline 118. That is, the deployment manager 116 may begin performing the next stage of the pipeline 118, prior to the current stage actually completing.

Figure 2:
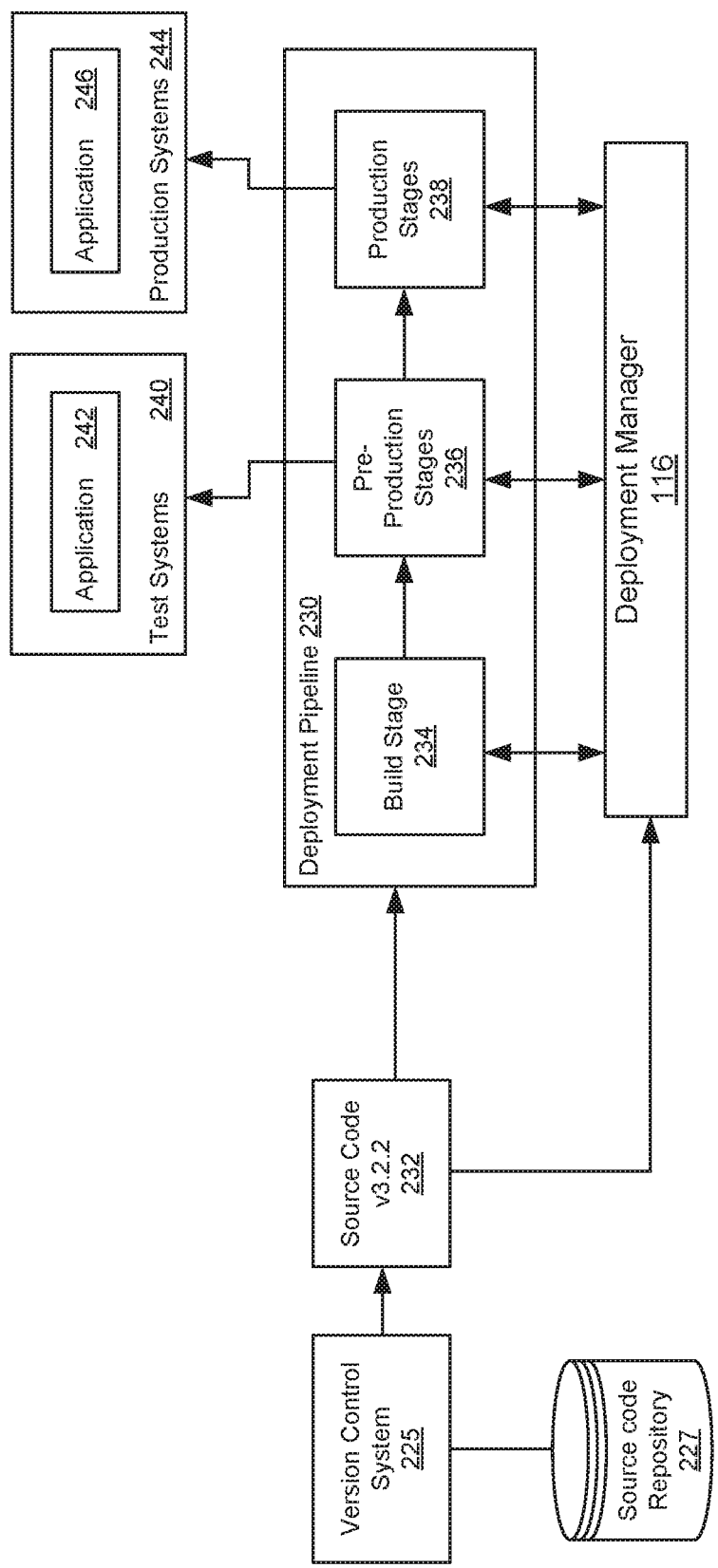
FIG. 2 illustrates an example of a deployment pipeline which supports preemptive deployments for certain pipeline stages being used to update a production application or service, according to one embodiment.

FIG. 2 illustrates an example of a deployment pipeline 230 which supports preemptive deployments for certain pipeline stages being used to update an application 246 on production systems 244, according to one embodiment. Deployment pipeline 230 may be used to update software application 246 on production systems 244.

The source code repository 227 stores source code of the application 246, along with related configuration data, resource files, scripts, and any other artifacts associated with the application 246. Changes to the source code of application 246 may be submitted to the version control system 225 and reviewed before being put into production. In one embodiment, each change to the source code of application 246 committed to the version control system 225 may be used to prepare a deployable build package of the application 246.

As shown, deployment pipeline 230 includes a build stage 234, pre-production stages 236, and production stages 238. In this example, a new build package of the application 246 (labeled as source code 232, version 3.2.2) has been committed to the source code repository 227, triggering a new deployment cycle. In response, the deployment manager 116 initiates a new deployment of the application 246 to push version 3.2.2 into production using the deployment pipeline 230. During the build stage 234, the deployment pipeline 230 may compile or interpret source code 232 to generate an executable version of the application 246 for deployment. If any errors or dependencies are identified during the build stage 234, the deployment process is discontinued. Otherwise, the resulting executable versions of the application 246 (or install packages) generated during the build stage 234 are passed to pre-production stages 236.

During the pre-production stages 236, the executables are tested, e.g., using unit tests, integration tests, test suites, and sample data, etc., prior to being used to process customer traffic. For example, the application being deployed may be installed on the test systems 240—shown in FIG. 2 as application 242. Once installed, the deployment pipeline 230 may initiate a variety of tests to evaluate the application being deployed on the test systems 240. For example, the pre-production stages 236 may include unit and integration testing stages, followed by beta stage tests. During beta stages, the application 242 may be tested by processing a specified number of transactions using sample data and determining whether the application 242 performs as expected, e.g., using a test framework or harness or by engineers interacting with the application 242 on test systems 240. As another example, varying degrees of load may be submitted to the application 242 on test systems 240 to determine how the application 242 performs under normal and anticipated peak load.

While each pre-production stage 236 is active, the deployment manager 116 may initiate a preemptive deployment of the next stage. For example, assume the next pre-production stage 236 is a beta stage test where the application 242 is installed on a fleet of VM instances. In such a case, the deployment manager 116 could use a cloud formation service to provision and launch the fleet of VM instances used during the beta stage as part of a preemptive deployment. Once the fleet of VM instances is active, the deployment manager 116 would then install the application 242 on each VM instance in the fleet in preparation of the beta stage. Provided the current stage completes successfully, then the beta stage can begin without having to wait for the fleet to be provisioned and launched and without having to wait for the application to be installed and configured. If the current stage fails (or otherwise times out), the fleet of VM instances may be de-allocated.

As another example, assume the last pre-production stage 236 performs a sustained load test of the application 242 on test systems 240 over a period of several hours and the first stage in production stages 238 is a one-box production deployment. In such a case, deployment manager 116 may determine a historical approval percentage of the load test in deploying prior versions of the application (e.g., versions prior to the current release candidate 3.2.2). Assuming the historical approval percentage associated with the load test is above a specified threshold (or other deployment conditions are satisfied), then the deployment manger 116 may install and configure the application 246 on one of the production systems 244 to prepare to perform the one-box production stage test. In addition, the deployment manager 116 could provision or launch any other systems, applications, or transient services needed by the one-box stage, such as instantiating any performance metric monitors or alarms needed to evaluate the application 246 during the one-box stage.

However, until the sustained load test of the application 242 on test systems 240 is complete, the deployment of application 246 on the one production system 244 is left in an inactive state. At the same time, the overhead and time of preparing for the one-box test occurs during the ongoing load test of application 242. For example, assume a symbolic link on a file system is used to identify the current in-use version of application 246 on production system 244. In such a case, the symbolic link is not changed to point to the installed location of application 246 (based on version 3.2.2) until the final pre-production testing stage is complete. Once the load test completes, the one-box test can begin by simply changing the symbolic link to point the installed location of application 246 (again, based on version 3.2.2). Additionally, the deployment manager 116 updates the approval metrics of each pre-production test stage 236 as each given stage completes successfully (or fails, aborting the current deployment cycle).

During each production stage 238, the release candidate of application 246 being deployed (based on version 3.2.2) may be pushed into increasingly broader production use until the deployment is complete. For example, the production stages 238 may include a gamma integration test stage, a one-box test stage, and full production deployment stage. While each production stage 238 is being performed, the deployment manager 116 determines whether to initiate a preemptive deployment of the next stage. Continuing with the example discussed above, assume the approval workflow for the one-box production test stage requires that the application 246 process a minimum number of production transactions without error and remain running for a minimum period of time without needing to be restarted. As above, if the historical approval percentage associated with the one-box production stage is above a specified threshold (or satisfies other conditions for preemptive deployment), then the deployment manger 116 may install and configure the application 246 on production systems 244 associated with the next stage to prepare for a broader production deployment. For example, while performing the one-box test, the application 246 could be preemptively deployed to a fleet of virtual machine instances used to provide a public facing production service, such as the example ecommerce web site discussed above relative to FIG. 1. In such a case, the deployment 116 could orchestrate the installation and configuration of application 246 on each production system 244 included in the next deployment stage (i.e., each virtual machine instance hosting the application being deployed). Again, however, such a preemptive deployment remains in an inactive state until the one-box test is successfully completed. Should the one-box stage not complete successfully (or simply time out) then the installation of application 246 based on the preemptive deployment may be rolled back. Additionally, the deployment manager 116 updates the approval percentage of each production test stage 238 as each stage completes successfully or fails (aborting the current deployment cycle).

In one embodiment, the deployment manager 116 may be configured to perform a preemptive deployment of application 246 (based on version 3.2.2) in a manner to minimize any disruption to the currently installed version of application 246 (i.e., to a version prior to 3.2.2). For example, the deployment application 116 may determine to delay (or forego) a preemptive deployment based on a current load on a given production system 244 or based on a performance metric (e.g., CPU utilization) exceeding a given threshold. In other cases, the preemptive deployment could be scheduled to occur during times of expected low activity.

Figure 3:
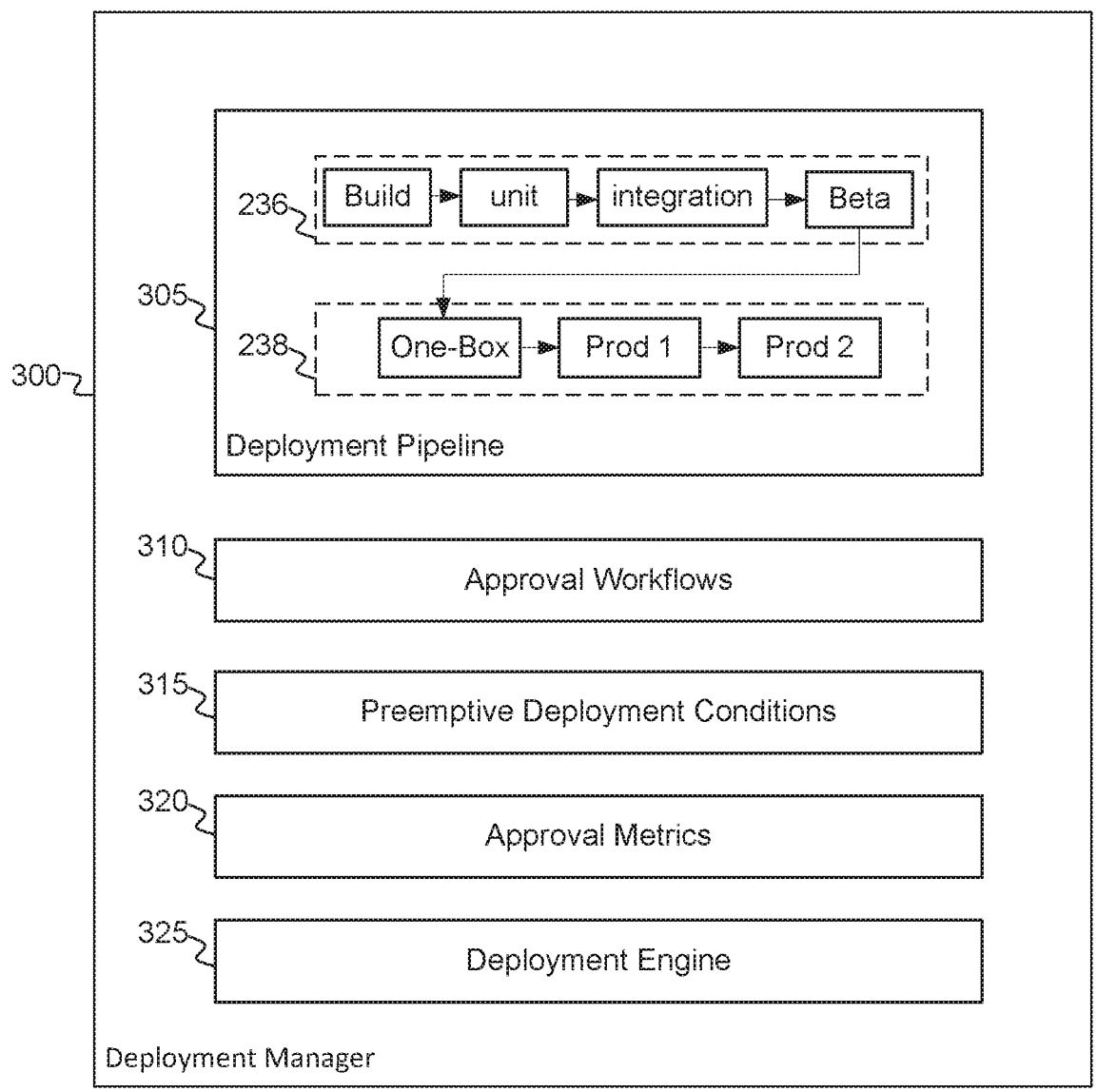
FIG. 3 illustrates example components of a deployment manager used to update a software application using a deployment pipeline which supports preemptive deployments for certain pipeline stages, according to one embodiment.

FIG. 3 illustrates example components of a deployment manager 300 used to update a software application using a deployment pipeline which supports preemptive deployments for certain pipeline stages, according to one embodiment. As shown, the deployment manager 300 includes a deployment pipeline 305, preemptive deployment conditions 315, approval metrics 320, and a deployment engine 235.

The deployment pipeline 305 includes a set of pre-production stages 236 and production stages 238. In this example, the pre-production stages 236 include build, unit, integration, and beta stages, and the production stages 238 include a one-box stage, a production 1 stage, and a production 2 stage. Each stage may be associated with a computing environment (e.g., a set of hosts in a test or production setting) and a collection of one or more tests to perform during a given stage. Approval workflows 310 specify conditions used to determine whether an application under deployment passes the tests performed at given stage. The deployment engine 325 provides one or more software applications used to manage the preemptive deployment process during each deployment cycle, i.e., while deploying an updated application into production through the pipeline 305. For example, the deployment engine 325 may be configured to collect approval metrics 320 during each deployment cycle indicating what stages passed, failed (or otherwise timed out) during the deployment cycle. The approval metrics 320 generally indicate how often a given stage of the deployment pipeline 305 passes the corresponding approval workflow 310.

The preemptive deployment conditions 315 specify criteria for determining whether to perform a preemptive deployment for a given stage of the pipeline 305. For example, the conditions 315 could specify a threshold approval percentage a given stage needs to achieve before performing a preemptive deployment of the next stage of the pipeline 305. While the deployment conditions 315 for any given stage may be set as a matter of preference; in practice, the more restrictive the deployment conditions 315, the more likely it needs to be that an application being deployed will pass the current stage before a preemptive deployment occurs relative to the next stage. Setting a high threshold could be useful in some cases, e.g., to limit preemptive deployments that end up being rolled back from occurring in busy production environments or that incur substantial overhead in provisioning a computing environment. In other cases, setting a low threshold may be useful, e.g., where the preemptive deployment occurs relative to a pipeline stage in a test environment or in limited production environments, such as a one-box production stage. In addition to an approval percentage, preemptive deployment conditions 315 could specify a function used to evaluate the approval metrics 320 for a stage, such as a function that weights recent deployments greater than older ones. Conditions 315 could also be related to the computing environment associated with a stage, e.g., a preemptive deployment could be skipped for a production stage based on the then current production load on the systems associated with that stage.

During a deployment cycle, if the deployment conditions 315 for a current (or initial) stage is satisfied, the deployment engine 325 may initiate a preemptive deployment for the subsequent stage of pipeline 305. For example, assume that the approval metrics 320 for the one-box stage satisfy the corresponding deployment conditions 315. In such a case, the deployment engine 325 may begin deploying the updated application to hosts included in the production 1 stage of the pipeline 305. Presuming the one-box stage passes the corresponding approval workflow 310, then the deployment engine 325 may initiate the production 1 stage by simply activating the updated application deployed to the hosts associated with the production 1 stage during the preemptive deployment. Similarly, once the production 1 stage is active, the deployment engine 325 may initiate a preemptive deployment in the production 2 stage. The more stages of the deployment pipeline 305 with approval metrics 320 that meet the corresponding deployment conditions 315, the more the overall time required to complete a deployment cycle may be reduced.

Figure 4:
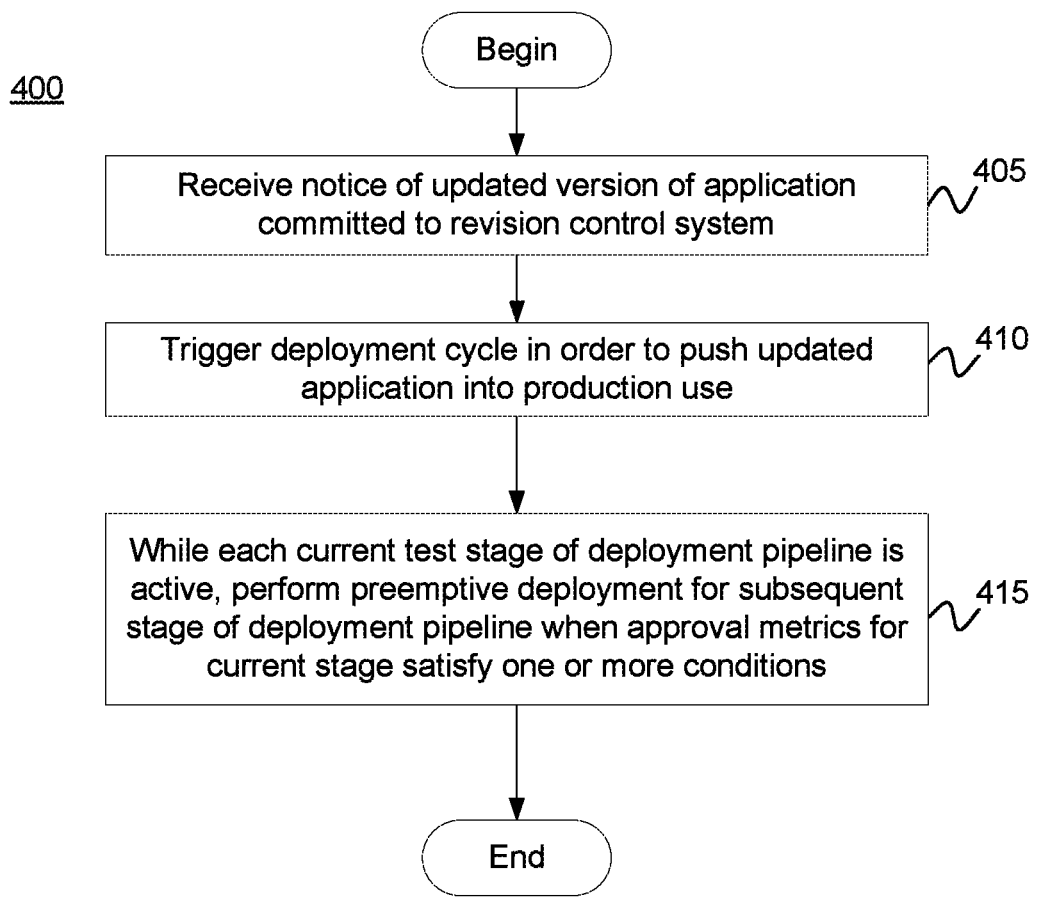
FIG. 4 illustrates a method for updating a software application using a deployment pipeline which supports preemptive deployments for certain pipeline stages, according to one embodiment.

FIG. 4 illustrates a method 400 for updating a software application using a deployment pipeline which supports preemptive deployments for certain pipeline stages, according to one embodiment. As shown, the method 400 begins at step 405 where a deployment manager receives notice that an updated version of a software application is available for deployment. For example, the deployment manager may monitor (or receive notifications from) a source code repository regarding changes committed to a production build tree associated with the application. Once an updated version of the application is available, at step 410, the deployment manager triggers a deployment cycle to push the new revision of the application into production use via a deployment pipeline corresponding to the application.

At step 415, the deployment manager may monitor the state of the deployment pipeline in order perform a preemptive deployment relative to certain stages of the application. For example, the deployment manager may evaluate the preemptive deployment conditions (e.g., an approval percentage) for a current stage of the deployment pipeline to decide whether to prepare the subsequent stage for deployment before the current stage is complete. In one embodiment, the deployment manager may provision and configure a computing environment needed for the subsequent stage. For example, the deployment manager could use a cloud formation service launch a fleet of virtual machine instances, configure and provision monitoring, services, alarm services, messaging services, etc. After performing any actions needed to prepare the computing environment for the subsequent stage, the deployment manager may install and configure an instance of the application on each host associated with the subsequent stage. Alternatively, the deployment manager could distribute a build package corresponding to the updated application to each host associated with the subsequent deployment stage. In another case, a deployment agent on a given host could be notified to pull an instance of the updated application onto that host for installation and deployment. Of course, the particular approach for preforming a preemptive deployment to hosts on a subsequent deployment stage may be tailored to suit the needs of a particular case. In one embodiment, however, any applications, systems, or services readied for use remain idle and instances of the application installed by the preemptive deployment are not activated. That is, the updated application installed on a given host is not used unless and until the prior stage of the deployment pipeline is successfully completed. Once the prior stage is complete, the subsequent stage may be initiated simply activating the updated application deployed to the hosts during the preemptive deployment. Additionally, as stages of the deployment pipeline are completed, the deployment manager may update the approval metrics associated with one or more stages of the deployment pipeline.

Figure 5:
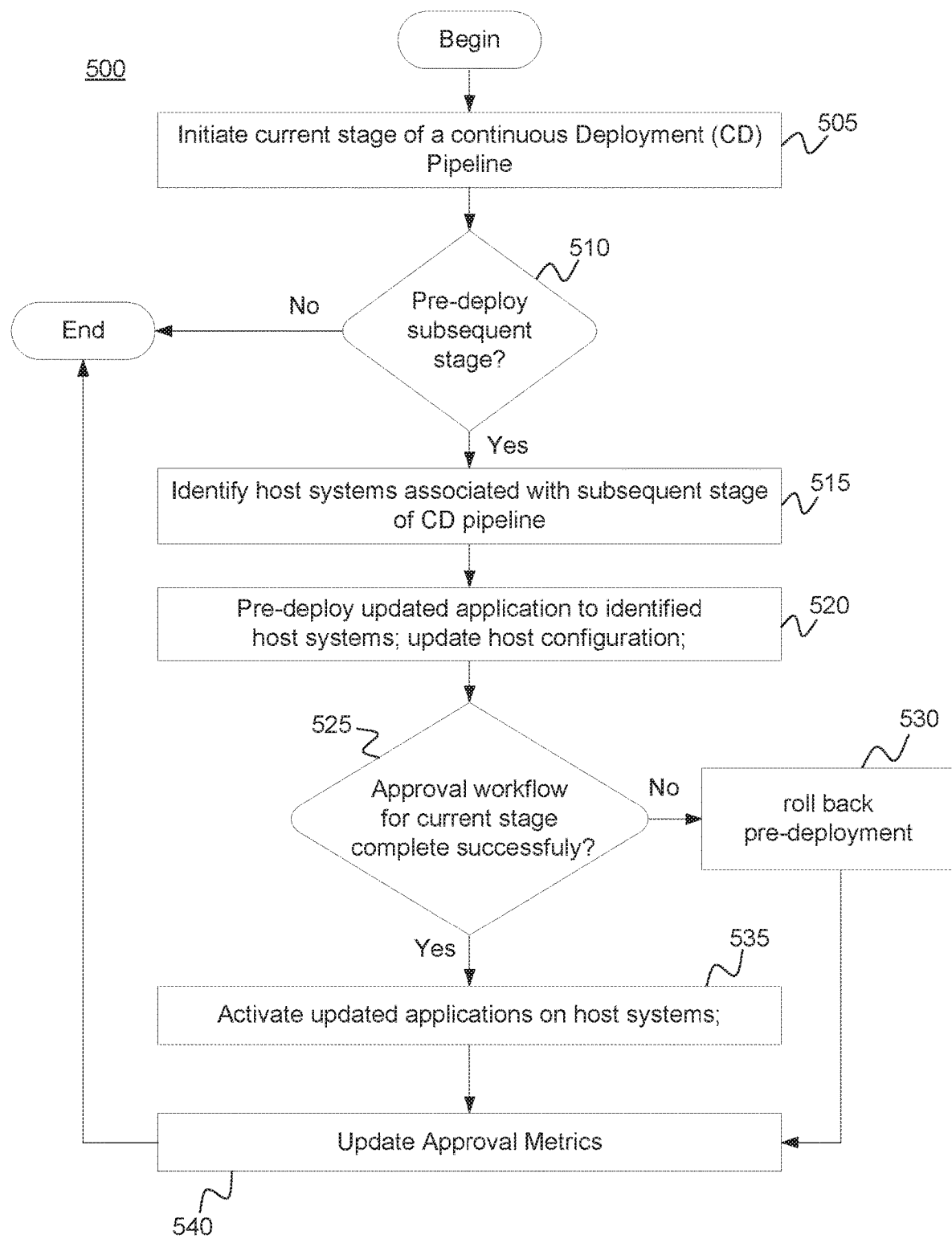
FIG. 5 illustrates a method for performing a preemptive deployment for a given stage of a deployment pipeline, according to one embodiment.

FIG. 5 illustrates a method 500 for performing a preemptive deployment for a given stage of a deployment pipeline, according to one embodiment. As shown, the method 500 begins at step 505, where a current stage of a deployment pipeline is initiated. Note, when the deployment pipeline is itself initiated to deploy an updated application, the initial stage of the pipeline may be the first current stage. At step 510, while the current stage of the deployment pipeline is underway, the deployment manager determines whether to perform a preemptive deployment for the subsequent pipeline stage (relative to the current stage). As described above, the determination may be based on a historical approval metrics of the current stage and the preemptive deployment conditions specified for the current stage. If a preemptive deployment is not performed for the subsequent stage, then the method 500 ends.

Otherwise, at step 515, the deployment manager prepares a computing environment for the subsequent stage and identifies one or more host systems associated with the subsequent stage of the deployment pipeline (again relative to the current stage). At step 520, the application being deployed (or build packages of that application) are distributed, installed, and otherwise configured on each host identified at step 515. As noted, e.g., each host may install and configure the updated application using build or install packages distributed by the deployment manager. In one embodiment, the preemptive deployment occurring at step 520 installs and configures the updated application (and any dependencies) on each host without activating the updated application. That is, the updated application is deployed in an inactive state. Further, the existing version of the application on each host may remain active until the current stage of the deployment pipeline is complete.

At step 525, if the updated application passes an approval workflow associated with the current stage of the deployment pipeline, then the instances of the application pre-deployed at step 520 are activated. In one embodiment, e.g., the deployment manager may change a symbolic link used to point to the installed location of the application to the pre-deployed instance. Otherwise, at step 530, if the current stage does not complete, fails, or otherwise times out, the preemptive deployment occurring at step 520 is rolled back and removed from the host. In addition, the deployment manager may deallocate or teardown any transient resources, applications, or services instantiated or provisioned in preparation of the next deployment stage. Following step 530 or 535, the approval metrics associated with the current stage are updated (step 540) and the method 500 ends.

Figure 6:
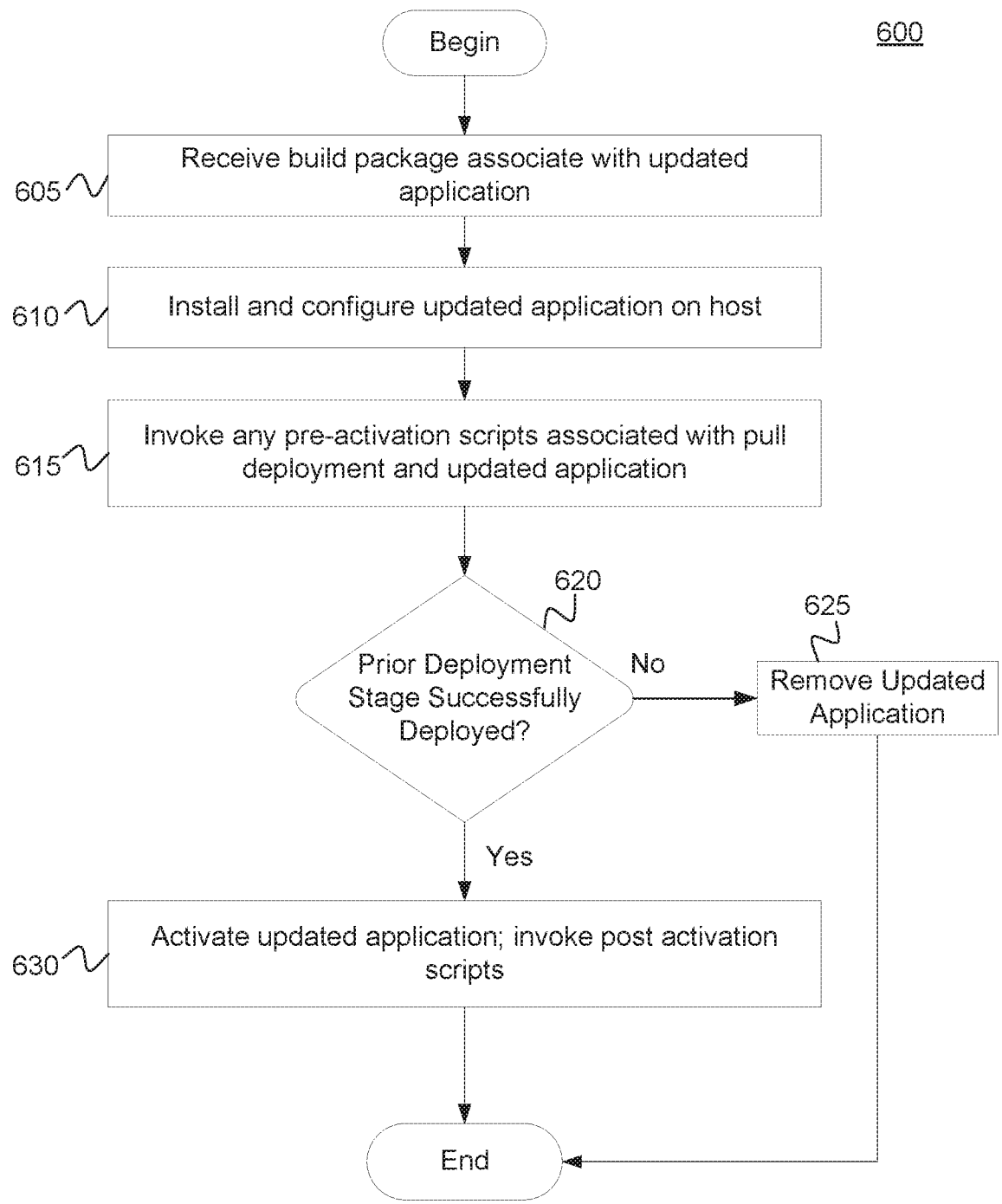
FIG. 6 illustrates a method for performing a preemptive deployment of an updated application on a computing host, according to one embodiment.

FIG. 6 illustrates a method 600 for a computing host to perform a preemptive deployment of an updated application, according to one embodiment. As shown, the method 600 begins at step 605, where a build package associated with an updated application being deployed is received. For example, a deployment manager may receive a build package generated during a build stage of the deployment pipeline and distribute it to hosts associated with certain subsequent stages of the deployment pipeline, as described above.

At step 610, the updated application is installed and configured on a given host. For example, a deployment agent on the host may receive and install the build package on the host using a variety of package management tools (e.g., RPM, ANT, apt-get, MSI, etc.). In other cases, the deployment manger may establish a connection with the host and orchestrate the installation and confirmation of the build package directly. At step 615, any scripts or other configuration artifacts associated with the updated application may be invoked to complete the preemptive deployment of the updated application on the host. For example, a pre-activation script could provision services and computing infrastructure, configure features of a host environment, generate security certificates, or provide information used by the updated application once activated, e.g., usernames, accounts, network addresses, etc.

At step 620, if the prior deployment stage is successful, then the host may activate the updated application and invoke any post activation scripts (step 630). For example, a post activation script could change symbolic links, establish communication sessions with other systems, e.g., establishing a database connection using network information, database account names, and credentials provided by pre-activation script. Once activated, the deployment pipeline begins performing the approval workflow for the now-current deployment stage using the instance of the updated application installed by the preemptive deployment. Otherwise, at step 625, if the prior deployment stage does not complete, than the updated application installed via the preemptive deployment may be deleted or otherwise removed from the host, along with any resources or artifacts installed on or generated by the host as part of the preemptive deployment.

Figure 7:
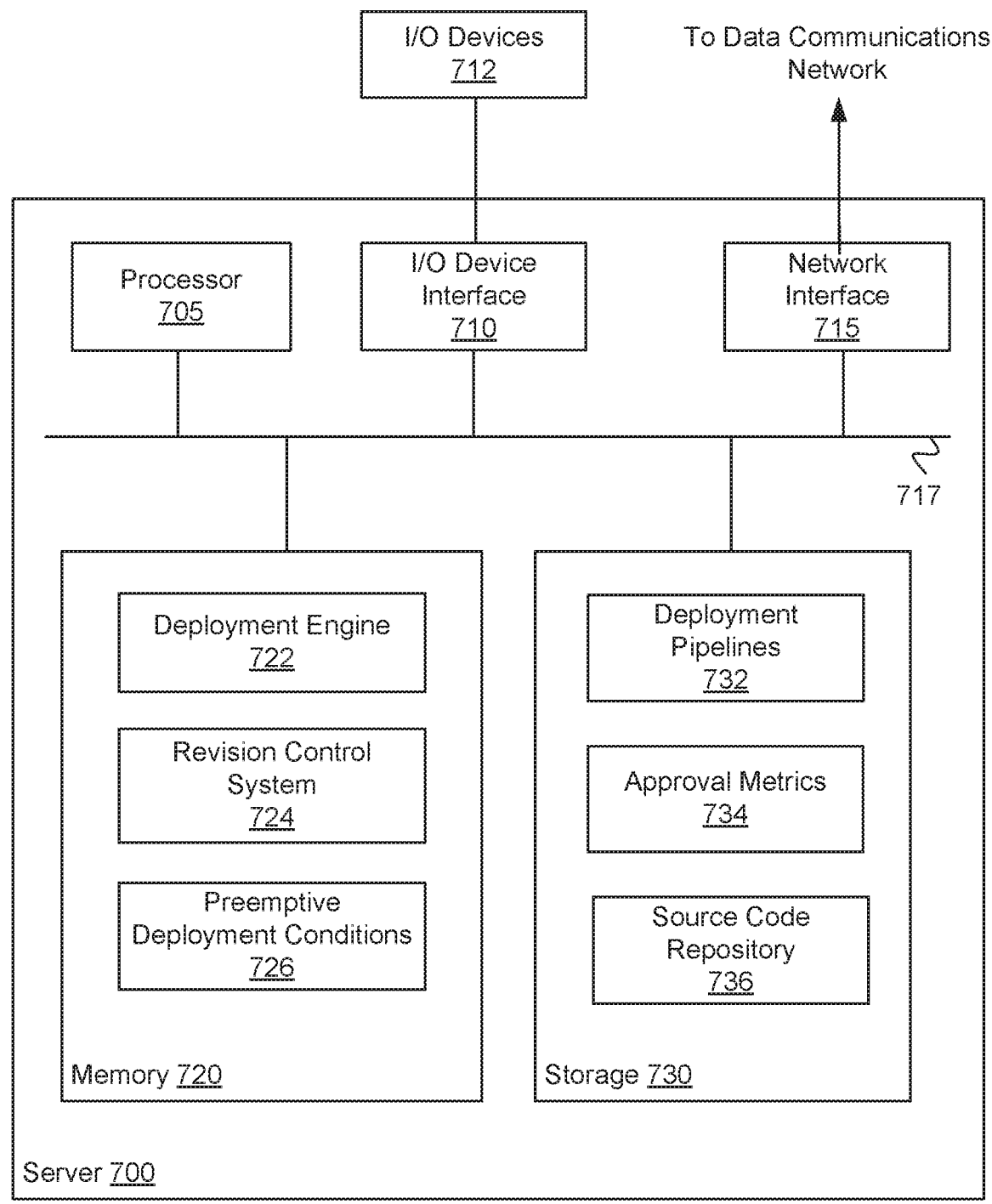
FIG. 7 illustrates an example computing system used to host components of the deployment manager illustrated in FIGS. 1-3, according to one embodiment.

FIG. 7 illustrates an example computing system used to host components of the deployment manager illustrated in FIGS. 1-3, according to one embodiment. As shown, the computing system 700 includes, without limitation, a central processing unit (CPU) 705, a network interface 715, a memory 720, and storage 730, each connected to a bus 717. Computing system 700 also includes an I/O device interface 710 connecting I/O devices 712 (e.g., keyboard, display and mouse devices) to the computing system 700. In context of this disclosure, the components shown in computing system 700 correspond to both physical computing systems (e.g., a system in a data center) as well as components of a virtual machine (VM) instance executing within a computing cloud. Further, a cloud computing service provider could offer components of the deployment manager as web services accessed using a network browser or dedicated console application. Further still, while shown as running on a single computing server 700, components in memory 720 and storage 730 may be deployed across multiple computing servers.

CPU 705 retrieves programming instructions and application data stored in the memory 720 and storage 730. The interconnect 717 is used to transmit programming instructions and application data between the CPU 705, I/O device interface 710, storage 730, network interface 715, and memory 720. Note, CPU 705 is included to be representative of a single CPU, multiple CPUs, a single CPU having multiple processing cores, and the like, and the memory 720 is generally included to be representative of a random access memory. The storage 730 may be a disk drive or flash storage device. Although shown as a single unit, the storage 730 may be a combination of fixed and/or removable storage devices, such as fixed disc drives, removable memory cards, optical storage, network attached storage (NAS), or a storage area-network (SAN).

Illustratively, the memory 720 includes a deployment engine 722, revision control system 724, and preemptive deployment conditions 726. Storage 730 includes one or more deployment pipelines 732, approval metrics 734, and source code repository 736. As described, revision control system 724 is used to control changes to the source code of an application stored in the source code repository 736. In one embodiment, as changes to the source code of an application are committed in the revision control system 724, deployment engine 722 may respond by triggering a pre-emptive deployment of an updated application into production use via a corresponding deployment pipeline 732. Further, as described, the deployment engine 722 may perform a preemptive deployment of the updated application to a computing environment and set of hosts associated with a next deployment stage of the deployment pipeline 732 while a current stage of the deployment pipeline 732 is active. In one embodiment, the deployment engine preforms a preemptive deployment when the approval metrics (i.e., a measure of how often an approval workflow for the current stage of the deployment pipeline 732 is completed successfully) exceed a preemptive deployment condition 726.

In the preceding, reference is made to embodiments presented in this disclosure. However, the scope of the present disclosure is not limited to specific described embodiments. Instead, any combination of the preceding features and elements, whether related to any given embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed above are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium storing instructions executable to perform an operation for preemptively deploying an updated version of an application being deployed by a deployment pipeline, the operation comprising:
    initiating a first stage of the deployment pipeline, wherein the deployment pipeline specifies a sequence of stages for deploying the updated version of the application into a production computing environment and wherein the first stage has an associated approval workflow;
    determining, by operation of a processor when executing the instructions, an approval rate comprising a rate of prior versions of the application successfully completing the approval workflow during prior deployments;
    determining that the approval rate satisfies one or more preemptive deployment conditions associated with the first stage of the deployment pipeline; and
    before the first stage has approved the updated version of the application, preemptively deploying, in an inactive state, an instance of the updated version of the application on one or more computing hosts associated with a second stage that directly follows the first stage of the deployment pipeline in the sequence of stages, after which the preemptively deployed instance is activable, upon approval of the updated version by the first stage, to complete the second stage.

2. The non-transitory computer-readable medium of claim 1, wherein the operation further comprises:
    determining that the updated version of the application has satisfied the approval workflow associated with the first stage of the deployment pipeline;
    initiating the second stage of the deployment pipeline by activating the instance of the updated version of the application deployed on each of the one or more computing hosts; and
    updating the approval rate.

3. The non-transitory computer-readable medium of claim 1, wherein the operation further comprises:
    determining that the updated version of the application has failed the approval workflow associated with the first stage of the deployment pipeline;
    removing the instance of the updated version of the application deployed on each of the one or more computing hosts; and
    updating the approval rate.

4. The non-transitory computer-readable medium of claim 1, wherein deploying the updated version of the application comprises:
    provisioning one or more services in a computing environment associated with the second stage of the deployment pipeline, wherein the computing environment includes the one or more computing hosts.

5. The non-transitory computer-readable medium of claim 1, wherein the sequence of stages include one or more pre-production stages and one or more production stages used to deploy the updated version of the application into the production computing environment.

6. The non-transitory computer-readable medium of claim 1, wherein deploying the instance of the updated version of the application to the one or more computing hosts associated with the second stage of the deployment pipeline comprises installing and configuring the application on each of the one or more computing hosts.

7. A system, comprising:
a processor; and
a memory storing instructions, which, when executed on the processor, performs an operation for preemptively deploying an updated version of an application, the operation comprising:
   initiating a current stage of a deployment pipeline, wherein the deployment pipeline specifies a sequence of stages for deploying the updated version of the application into a production computing environment;
   determining an approval rate comprising a rate of prior versions of the application successfully completing the current stage during prior deployments;
   determining that the approval rate satisfies one or more preemptive deployment conditions; and
   before the current stage has approved the updated version of the application, preemptively deploying, in an inactive state, an instance of the updated version of the application to at least a first computing host associated with a subsequent stage that directly follows the current stage of the deployment pipeline in the sequence of stages, after which the preemptively deployed instance is activable, upon approval of the updated version by the current stage, to complete the subsequent stage.

8. The system of claim 7, wherein deploying the updated version of the application comprises provisioning one or more services in a computing environment associated with the subsequent stage of the deployment pipeline, wherein the computing environment includes the first computing host.

9. The system of claim 7, wherein the operation further comprises:
   receiving an indication that the updated version of the application is available for deployment using the deployment pipeline, wherein the indication is received in response to an updated version of source code of the application being committed into a revision control system.

10. The system of claim 7, wherein the operation further comprises:
   determining that the current stage of the deployment pipeline has completed successfully;
   initiating the subsequent stage of the deployment pipeline by activating the updated version of the application deployed on at least the first computing host; and
   updating the approval rate.

11. The system of claim 7, wherein the operation further comprises:
   determining that the current stage of the deployment pipeline fails to complete successfully;
   updating the approval rate; and
   removing the updated version of the application from at least the first computing host.

12. A computer-implemented method for deploying an application, the computer-implemented method comprising:
   receiving an indication that source code of an updated version of the application has been committed into a revision control system;
   triggering a cycle of a deployment pipeline to deploy, into a production computing environment, an updated version of the application built from the source code, wherein the deployment pipeline specifies a sequence of stages for deploying the updated version of the application;
   initiating a current stage of the deployment pipeline;
   determining, by operation of a processor, an approval rate comprising a rate of prior versions of the application successfully completing the current stage during prior deployments;
   determining that the approval rate satisfies one or more preemptive deployment conditions; and
   before the current stage has approved the updated version of the application, preemptively deploying, in an inactive state, an instance of the updated version of the application to one or more computing hosts associated with a subsequent stage that directly follows the current stage of the deployment pipeline in the sequence of stages, after which the preemptively deployed instance is activable, upon approval of the updated version by the current stage, to complete the subsequent stage.

13. The computer-implemented method of claim 12, further comprising:
   determining that the current stage of the deployment pipeline has completed successfully;
   initiating the subsequent stage of the deployment pipeline by activating the updated version of the application deployed on each of the one or more computing hosts; and
   updating the approval rate.

14. The computer-implemented method of claim 12, further comprising:
   determining that the current stage of the deployment pipeline has failed to complete successfully;
   removing the instance of the updated version of the application deployed on each of the one or more computing hosts; and
   updating the approval rate.

15. The computer-implemented method of claim 12, further comprising, building a deployable version of the application from the source code of the updated version of the application.

16. The computer-implemented method of claim 12, wherein the instance of the updated version is preemptively deployed via a predefined operation, wherein the subsequent stage is completed in a reduced amount of time due to the predefined operation already having been performed;
   wherein successfully completing the approval workflow comprises passing the approval workflow as opposed to failing the approval workflow.

17. The computer-implemented method of claim 16, wherein the preemptively deployed instance is activable, upon the eventual approval of the updated version by the current stage, to complete the subsequent stage without having to perform the predefined operation subsequent to the approval of the updated version;
   wherein the subsequent stage is completed in a lesser amount of time than absent preemptive deployment, thereby reducing a total amount of time needed to execute the deployment pipeline.

18. The computer-implemented method of claim 17, wherein the computer-implemented method is performed by a deployment manager and further comprises building a deployable version of the application from the source code of the updated version of the application, wherein the deployment manager is configured to, upon determining that the current stage of the deployment pipeline has completed successfully, update the approval rate and initiate the subsequent stage of the deployment pipeline by activating the updated version of the application deployed on each of the one or more computing hosts.

19. The computer-implemented method of claim 18, wherein the deployment manager is further configured to, upon determining that the current stage of the deployment pipeline has failed to complete successfully, update the approval rate and remove the instance of the updated version of the application deployed on each of the one or more computing hosts.

20. The computer-implemented method of claim 19, wherein deploying the instance of the updated version of the application comprises sending a build package to each of the one or more computing hosts, whereupon the respective computing host installs and configures the updated version of the application from the build package.

21. The computer-implemented method of claim 20, wherein the sequence of stages include one or more pre-production stages and one or more production stages used to deploy the updated version of the application into the production computing environment;
    wherein the approval rate indicates a percentage of how often prior versions of the application have successfully completed the current stage of the deployment pipeline, wherein the preemptive deployment conditions specify a minimum threshold for the percentage.

\* \* \* \* \*

UNITED STATES PATENT AND TRADEMARK OFFICE
CERTIFICATE OF CORRECTION

PATENT NO. : 10,642,599 B1
APPLICATION NO. : 16/201528
DATED : May 5, 2020
INVENTOR(S) : David Killmon et al.

Page 1 of 1

It is certified that error appears in the above-identified patent and that said Letters Patent is hereby corrected as shown below:

In the Claims

In Column 16, Line 54, in Claim 17, before "approval" delete "eventual".

Signed and Sealed this
Twenty-first Day of July, 2020

Andrei Iancu
*Director of the United States Patent and Trademark Office*